(12) United States Patent
Hunukumbure (10) Patent No.: US 10,285,138 B2
(45) Date of Patent: May 7, 2019

(54) MOBILE STATION-CONTROLLED WAKE-UP OF A SMALL CELL BASE STATION FROM A SLEEP MODE

(71) Applicant: FUJITSU CONNECTED TECHNOLOGIES LIMITED, Kawasaki-shi, Kanagawa (JP)

(72) Inventor: Mythri Hunukumbure, Hillingdon (GB)

(73) Assignee: FUJITSU CONNECTED TECHNOLOGIES LIMITED, Kawasaki (JP)

( * ) Notice: Subject to any disclaimer, the term of this patent is extended or adjusted under 35 U.S.C. 154(b) by 182 days.

(21) Appl. No.: 15/364,886

(22) Filed: Nov. 30, 2016

(65) Prior Publication Data

US 2017/0086144 A1    Mar. 23, 2017

Related U.S. Application Data

(63) Continuation of application No. PCT/EP2015/052655, filed on Feb. 9, 2015.

(30) Foreign Application Priority Data

Jun. 17, 2014    (EP) .................................... 14172701

(51) Int. Cl.
*H04W 52/18*    (2009.01)
*H04W 52/02*    (2009.01)
(Continued)

(52) U.S. Cl.
CPC ............. *H04W 52/16* (2013.01); *H02J 3/382* (2013.01); *H02J 9/005* (2013.01); *H04L 5/0048* (2013.01);
(Continued)

(58) Field of Classification Search
CPC ............................. H04W 4/80; H04W 52/0229; H04W 52/0225
See application file for complete search history.

(56) References Cited

U.S. PATENT DOCUMENTS

2004/0203352 A1    10/2004   Hall et al.
2009/0102296 A1     4/2009   Greene et al.
(Continued)

FOREIGN PATENT DOCUMENTS

EP    2 387 265 A1    11/2011
EP    2 416 609 A1     2/2012
(Continued)

OTHER PUBLICATIONS

E. Ternon, P. Agyapong, L. Hu, A. Dekorsy, Database-aided Energy Savings in Next Generation Dual Connectivity Heterogeneous Networks, Proceedings of The 2014 IEEE Wireless Communications and Networking Conference, Apr. 6, 2014, pp. 2811-2816.*

(Continued)

*Primary Examiner* — Christopher M Crutchfield
(74) *Attorney, Agent, or Firm* — Myers Wolin, LLC (57) ABSTRACT

A method of waking up a small cell base station from a sleep mode, the method includes: by the mobile station: determining, based on stored location information indicating a location of the small cell base station and on a monitored current location of the mobile station, that the mobile station is in a coverage area of the small cell base station, determining, from serving cell information and a neighbor cell list, that the small cell base station is in the sleep mode, changing a transmission characteristic of the standard access signal so as to increase its transmission energy, in response to the determinations, and transmitting the changed access signal; and by the small cell base station: harvesting energy from the changed access signal that is transmitted by the mobile station, using a passive energy harvesting sensor, the (Continued)

harvested energy triggering a wake-up procedure in the small cell base station.

11 Claims, 5 Drawing Sheets

(51) Int. Cl.
| | | |
|---|---|---|
| *H04W 24/10* | (2009.01) | |
| *H04W 48/10* | (2009.01) | |
| *H04W 52/16* | (2009.01) | |
| *H02J 3/38* | (2006.01) | |
| *H02J 9/00* | (2006.01) | |
| *H04L 5/00* | (2006.01) | |
| *H04W 48/20* | (2009.01) | |
| *H04W 52/58* | (2009.01) | |
| *H04W 64/00* | (2009.01) | |
| *H04W 74/08* | (2009.01) | |

(52) U.S. Cl.
CPC .......... *H04W 24/10* (2013.01); *H04W 48/10* (2013.01); *H04W 48/20* (2013.01); *H04W 52/0206* (2013.01); *H04W 52/0216* (2013.01); *H04W 52/0225* (2013.01); *H04W 52/0245* (2013.01); *H04W 52/58* (2013.01); *H04W 64/003* (2013.01); *H04W 74/0833* (2013.01); *Y02D 70/00* (2018.01); *Y02D 70/1242* (2018.01); *Y02D 70/1262* (2018.01); *Y02D 70/1264* (2018.01); *Y02D 70/142* (2018.01); *Y02D 70/146* (2018.01); *Y02D 70/164* (2018.01)

(56) References Cited

U.S. PATENT DOCUMENTS

| | | | |
|---|---|---|---|
| 2013/0035090 A1 | 2/2013 | Moshfeghi | |
| 2013/0128785 A1* | 5/2013 | Guey ................ | H04W 52/0206 370/311 |
| 2014/0029586 A1* | 1/2014 | Loehr ................ | H04W 56/0005 370/336 |
| 2017/0048918 A1* | 2/2017 | Iwamura ........... | H04W 52/0206 |

FOREIGN PATENT DOCUMENTS

| | | | |
|---|---|---|---|
| EP | 2 453 706 A1 | | 5/2012 |
| EP | 14166410 | * | 4/2014 |
| EP | 2 916 596 A1 | | 9/2015 |
| WO | 2011/094081 A1 | | 8/2011 |

OTHER PUBLICATIONS

H. Ba, I. Demirkol, W. Heinzelman, Passive wake-up radios: From devices to applications, Ad Hoc Netwoks, vol. 11, Issue 8, Nov. 2013, pp. 2605-2621.*

G. Gamm, L. Reindl, Range Extension for Wireless Wake-up Receivers, 9th International Multi-Conference on Systems, Signals and Devices, 2012, pp. 1-4.*

(EDG) Binary 30-3e 5, originally located at http://www.fujitsu.com/downloads/EDG/binary/pdf/find/30-3e/5.pdf , document no longer available from website.

Ashraf et al., Abstract of "Improving Energy Efficiency of Femtocell Base Stations Via User Activity Detection", Wireless Communications and Networking Conference (WCNC) 2010 IEEE, Sydney, Australia, Apr. 18-21, 2010, Electronic ISBN: 978-1-4244-6398-5. Note: Abstract Only.

International Search Report with Written Opinion of the International Searching Authority for corresponding International Patent Application No. PCT/EP2015/052655 dated Mar. 19, 2015.

Extended European search report with the European search opinion issued by the European Patent Office for corresponding European Patent Application No. 14172701.6 dated Nov. 18, 2014.

European Telecommunications Standards Institute (ETSI), LTE: "Evolved Universal Terrestrial Radio Access (E-UTRA): Physical channels and modulation", 3GPP TS 36.211 version 13.2.0 Release 13, Aug. 2016.

Powercast Corporation, "Product Datasheet P2110-915 MHz RF Powerharvester™ Receiver, Rev A", Apr. 2010.

Fujitsu Semiconductor Limited, "Datasheet for FRAM (Ferroelectric RAM) RFID LSI product family", Jan. 2015.

ShareTechnote, "RACH", downloaded from "http://www.sharetechnote.com/html/RACH_LTE.html#Preamble_Format", downloaded on Nov. 29, 2016.

* cited by examiner

FIGURE 1

| Preamble format | $T_{CP}$ | $T_{SEQ}$ |
|---|---|---|
| 0 | $3168 \cdot T_s$ | $24576 \cdot T_s$ |
| 1 | $21024 \cdot T_s$ | $24576 \cdot T_s$ |
| 2 | $6240 \cdot T_s$ | $2 \cdot 24576 \cdot T_s$ |
| 3 | $21024 \cdot T_s$ | $2 \cdot 24576 \cdot T_s$ |
| 4* | $448 \cdot T_s$ | $4096 \cdot T_s$ |

MOBILE STATION-CONTROLLED WAKE-UP OF A SMALL CELL BASE STATION FROM A SLEEP MODE

CROSS REFERENCES TO RELATED APPLICATIONS

This application is a continuation application of International Patent Application No. PCT/EP2015/052655, filed Feb. 9, 2015, and claims priority to European Patent Application No. EP14172701.6 filed Jun. 17, 2014 the contents of each are herein wholly incorporated by reference.

FIELD OF THE INVENTION

Embodiments disclosed herein relate to user mobile station-controlled wake-up of a small cell base station from a sleep mode.

BACKGROUND OF THE INVENTION

Smaller coverage cellular base stations, often referred to as small cells, Femto cells or Home eNBs (HeNBs) are becoming popular to provide cellular coverage within a confined area like a home or an office. (For convenience, such smaller coverage cellular base stations will be referred to herein as HeNBs.) The main benefits to the end users are the enhanced quality of service, by having the HeNB closer to them, and the increased capacity, by limiting the access to a few authorised users. For the operator, the off-loading of capacity by HeNBs enables more flexibility in network operations. In the long term, the use of HeNBs offers cost savings for the operator, as the operations cost and backhaul cost are usually borne by the end user. Usually the backhaul cost is a fixed monthly tariff but the electricity cost depends on the amount of usage of the Femto cell.

HeNBs are usually kept ON for the majority of the time, and this can incur a significant electricity cost to the end user even when implementing power efficient stand-by modes.

In HeNBs, the majority of energy is consumed within the processing units, as opposed to Macro eNBs where the majority energy consumption is within the RF units. Hence, a 'complete' sleep mode, in which the HeNB is switched off completely when its cell is idle, would provide a significant energy saving over simply switching off the RF units of the HeNB. A pertinent question is, then, how to wake up the HeNB from such a sleep mode when the HeNB its services are needed.

European patent application no. 14157776.7 discloses a method in which a wireless communications network (that is, a macrocell base station and/or a core network entity such as a Mobility Management Entity in the case of LTE) controls the wake up of a small cell base station from a sleep mode in which no power is consumed, by the purposeful delay of an access attempt made by a mobile station (also called user equipments, UEs, subscriber or mobile terminals.

It would be desirable to enable a mobile station to control the wake up of a small cell base station.

SUMMARY OF EMBODIMENTS OF THE INVENTION

One embodiment provides a method of waking up a small cell base station from a sleep mode, controlled by a mobile station involved in a random access procedure in which the mobile station is to transmit a standard access signal to a serving macrocell base station in whose coverage area the small cell base station is located, the method comprising: by the mobile station: determining, based on stored location information indicating a location of the small cell base station and on a monitored current location of the mobile station, that the mobile station is in a coverage area of the small cell base station, determining, from serving cell information and a neighbour cell list, that the small cell base station is in the sleep mode, changing a transmission characteristic of the standard access signal so as to increase its transmission energy, in response to the determinations, and transmitting the changed access signal; and by the small cell base station: harvesting energy from the changed access signal that is transmitted by the mobile station, using a passive RF energy harvesting sensor, the harvested energy triggering a wake-up procedure in the small cell base station.

The method, therefore, provides a mechanism to let the small cell base station enter a state of zero power consumption, that is a "complete sleep mode", when its services are not required, and to "wake up" the small cell base station from this state when its services are required. Compared to a scenario where a wireless communications network controls the wake up of a small cell base station from a sleep mode by purposefully delaying an access attempt made by a mobile station, here it is the mobile station that controls wake up of the small cell base station by changing a transmission characteristic of a standard access signal (i.e., the access signal that would normally be used, typically defined in advance) so that its transmission energy is increased. Increasing the transmission energy can increase the likelihood of triggering the passive energy harvesting sensor of the small cell base station. For example, a threshold level of the passive energy harvesting sensor can be set such that the changed access signal triggers the wake-up procedure whereas the standard access signal would not. Advantageously, little or no additional work load is placed on the network and little or no modifications to the network are required.

The mobile station can be registered to the small cell base station, i.e. can belong to a closed group of mobile stations associated with the small cell base station. Accordingly, the small cell base station can enter the sleep mode either when no mobile stations of the closed group is located in a coverage area of the small cell base station or when all user equipments of the closed group that are located in a coverage area of the small cell base station are in an idle mode. The macrocell base station provides underlay coverage for the small cell base station, that is, provides support for mobile stations that are in an idle mode when the small cell base station is in the sleep mode. As used herein the term "idle mode" means that the mobile station is not communicating user related data, voice or messaging with the network, while the term "active mode" means that the mobile station is communicating user related data, voice or messaging with the network. For example, the idle mode can be the RRC Idle mode in LTE and the active mode can be the RRC Connected mode in LTE.

As used herein, the term "transmission characteristic" refers to any characteristic related to the transmission of the access signal. The transmission characteristic of the standard access signal can be changed in different ways to achieve higher transmission energy, including increasing the transmission power and/or increasing the transmission duration. These can be characterized by the ease of implementation, i.e. the degree of change to the transmission characteristic(s).

In one embodiment, the mobile station determines, based on a measurement of a reference signal transmitted by the serving macrocell base station, a transmission power to be used for transmitting the standard access signal, and wherein changing the transmission characteristic of the standard access signal comprises increasing the transmission power. This provides a straightforward implementation of changing the transmission characteristic of the standard access signal. Furthermore, the changed access signal can still be treated as a 'valid' access signal by the macrocell base station and therefore provides dual functionality, both as an access signal and as a wake-up signal.

In another embodiment, the mobile station determines, based on system information received from the serving macrocell base station, a transmission format of the standard access signal that is expected by the serving base station, and wherein changing the transmission characteristic of the standard access signal comprises changing the transmission format of the standard access signal to a transmission format that is not expected by the serving base station. For example, changing the transmission format of the standard access signal can comprise increasing transmission duration of the standard access signal. This provides a more complex implementation of changing the transmission characteristic of the standard access signal. However, the likelihood of a falsely triggering the wake-up procedure in the small cell base station is reduced.

The use of an access signal having a transmission format that is not expected by the macrocell base station (i.e., a transmission format different from that which is specified in the system information, such as a System Information Block) can result in the rejection of the access attempt made by the mobile station. Thus, in one embodiment, the method further comprises, after transmitting the changed access signal at least once, reverting the transmission format of the changed access signal back to the transmission format of the standard access signal that is expected by the serving base station.

In one embodiment, the method further comprises, by the mobile station after transmission of the changed access signal: establishing a connection to the serving macrocell base station and, in response to detecting broadcast signals transmitted by the small cell base station after the wake-up procedure has been triggered, performing measurements on reference signals included as part of the broadcast signals and reporting the measurements to the serving macrocell base station. This measurement can be used to initiate handover from the serving macrocell base station to the small cell base station. This approach of mobile station initiated measurement reporting (rather than serving cell initiated reporting) makes the handover process much quicker.

The broadcast signals can broadly be classified into reference signals and synchronization signals. Where the wireless communication network is based on the 3GPP Long Term Evolution (LTE) standards for example, the reference signals can be the cell-specific reference signals, and the synchronization signals can include the primary and secondary synchronization signals. It will be appreciated that comparable signals are often provided in other wireless communication networks, although they may be given different names.

In one embodiment, the mobile station wirelessly receives, from the small cell base station in advance, location information of the small cell base station and computer readable program code which, when executed by a mobile station, causes the mobile station to perform the respective method steps. In this way, specific mobile stations, such as mobile stations registered to the small cell base station (i.e., belonging to a closed group of mobile stations associated with the small cell base station) can be configured to trigger the wake-up procedure of the small cell base station. The location information and computer readable program code can be 'pushed' to the mobile station when it first connects to the small cell base station. This is like downloading an application (commonly known as an 'App') and installing it in the mobile station.

The access signal can comprise a random access preamble, for example the RACH preamble defined by the LTE standards. The suitability of the RACH for the wake-up triggering derives from its repetitive nature. If the UE does not get the desired response (resource allocation) from the Macro eNB, it will repeat the signalling. If the Macro eNB does not recognize a certain RACH format, it will simply not respond to it, so that the UE has the opportunity to change the format and re-attempt.

One embodiment provides a method of waking up a small cell base station from a sleep mode, controlled by a mobile station involved in a random access procedure in which the mobile station is to transmit a standard access signal to a serving macrocell base station in whose coverage area the small cell base station is located, the performed by the mobile station and comprising: determining, based on stored location information indicating a location of the small cell base station and on a monitored current location of the mobile station, that the mobile station is in a coverage area of the small cell base station; determining, from serving cell information and a neighbour cell list, that the small cell base station is in the sleep mode; changing a transmission characteristic of the standard access signal so as to increase its energy, in response to the determinations; and transmitting the changed access signal.

One embodiment provides a method of waking up a small cell base station from a sleep mode, controlled by a mobile station involved in a random access procedure in which the mobile station changes a transmission characteristic of a standard access signal so as to increase its transmission energy, and transmits the changed standard access signal to a serving macrocell base station in whose coverage area the small cell base station is located, the method performed by the small cell base station and comprising: harvesting energy from the changed access signal that is transmitted by the mobile station, using a passive energy harvesting sensor, the harvested energy triggering a wake-up procedure in the small cell base station.

In one embodiment, the small cell base station wirelessly transmits, to the mobile station in advance, location information indicating a location of the small cell base station and computer readable program code which, when executed by a mobile station, causes the mobile station to: change the transmission characteristic of the standard access signal, when the mobile station determines that the mobile station is in a coverage area of the small cell base station and that the small cell base station is in the sleep mode, and transmit the changed access signal.

One embodiment provides a wireless communications system, comprising: a mobile station, comprising: a processor; a wireless communications unit configured to transmit access signals; a locating unit configured to determine a current location of the mobile station; and memory configured to store location information indicating a location of a small cell base station and computer readable program code which, when executed by the processor, causes the processor to: monitor the current location of the mobile station, determine, based on the stored location information and on the monitored current location of the mobile station, that the mobile station is in a coverage area of the small cell base station, determine, from serving cell information and a neighbour cell list, that the small cell base station is in the sleep mode, change a transmission characteristic of a standard access signal so as to increase its transmission energy, in response to the determinations, and transmit the changed access signal; and a small cell base station located in a coverage area of a macrocell base station, comprising: a wireless communications unit; and a passive energy harvesting sensor configured to, when the small cell base station is in a sleep mode, harvest energy from the changed access signal transmitted by the mobile station, and output a signal configured to trigger a wake-up procedure of the small cell base station.

One embodiment provides a mobile station, comprising: a processor; a wireless communications unit configured to transmit access signals; a locating unit configured to determine a current location of the mobile station; and memory configured to store location information indicating a location of a small cell base station and computer readable program code which, when executed by the processor, causes the processor to: monitor the current location of the mobile station, determine, based on the stored location information and on the monitored current location of the mobile station, that the mobile station is in a coverage area of a small cell base station, determine, from serving cell information and a neighbour cell list, that the small cell base station is in the sleep mode, change a transmission characteristic of a standard access signal so as to increase its transmission energy, in response to the determinations, and transmit the changed access signal.

One embodiment provides a small cell base station, comprising: a wireless communications unit; and a passive energy harvesting sensor configured to, when the small cell base station is in a sleep mode, harvest energy from an access that has a transmission characteristic which has been changed compared to a standard access signal so as to increase its transmission energy, and that has been transmitted by a mobile station to a serving macrocell base station in whose coverage area the small cell base station is located, and output a signal configured to trigger a wake-up procedure of the small cell base station.

The provision of a passive sensor (i.e., a sensor that requires no external wiring or battery to provide power) at the small cell base station enables the small cell base station to be completely powered down. The passive sensor can harvest electromagnetic energy or other wireless energy that can be used to energize or power the sensor.

One embodiment provides a computer program product comprising a computer readable storage medium having computer readable program code which, when executed by a mobile station, causes the mobile station to perform the aforementioned method.

The program code can be embodied as an application (an "App"), which can be downloaded or 'pushed' to the mobile station when it registers with and/or connects to the small cell base station.

Any combination of one or more computer readable medium(s) may be utilized. The computer readable medium may be a computer readable signal medium or a computer readable storage medium.

A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical data storage device, a magnetic data storage device, or any suitable combination of the foregoing. In the context of this disclosure, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Further embodiments, features, and advantages of the invention, as well as the structure and operation of the various embodiments of the invention are described in detail below with reference to accompanying drawings.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION OF EMBODIMENTS OF THE INVENTION

The embodiments described below are described in the context of LTE by way of example, where a wireless communication system (also referred to as the "wireless communication network") comprises one or more base stations (also referred to as "eNodeBs" or "eNBs"), each comprising a number of physical antennas and controlling one or more downlink (DL) cells, each DL cell having a corresponding uplink (UL) cell. Each DL cell may serve one or more mobile stations (referred to as "UEs") which may receive and decode signals transmitted in that serving cell. However, embodiments of the invention are not limited to LTE.

Embodiments provide techniques that can be utilized by a closed subscriber group (CSG) of UEs, connecting to a HeNB. When a CSG UE first connects to the HeNB, it will push down an App to the UE, the App including a mechanism to control the wake-up of the HeNB from a complete sleep mode. This mechanism is based on harvesting the RF energy of RACH signalling of a CSG UE. A passive operational (which requires no power) RF energy harvesting chip included with the HeNB harvests RF energy from the RACH signalling to trigger a wake-up mechanism. In particular, the wake-up mechanism is triggered only when a CSG UE is within the coverage zone of the sleeping HeNB. The App is provided with the fixed location of the HeNB, and is also updated on the CSG UE location regularly, to make this determination. The idle mode UEs within the sleeping HeNB zone are supported by the Macro eNB, which will routinely accept these UEs, as the best signal strength, accessible cell when the HeNB is not in operation.

Embodiments provide changing a RACH signal transmitted by a CSG UE, so that the HeNB does not treat the normal RACH signals from nearby non-CSG UEs as a wake-up trigger signal. The changed RACH signal according to embodiments conforms to the LTE standards. Two embodiments of the new RACH signal are described, distinguished by the degree of change that is required in the RACH pre-amble format.

Figure 1:
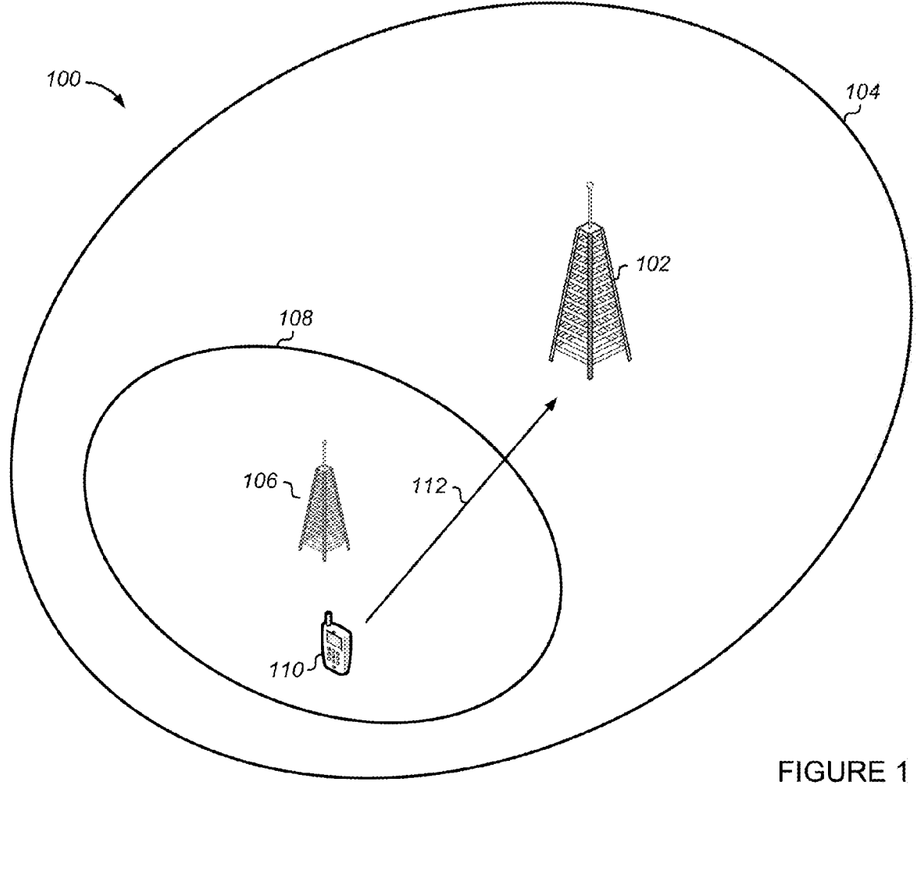
FIG. 1 schematically illustrates a network environment in which embodiments can be implemented.

FIG. 1 schematically illustrates a network environment 100 in which embodiments of the present invention can be implemented. In this particular example, the network environment 100 includes an evolved UMTS Terrestrial Radio Access Network (E-UTRAN) (also often referred to as the 3GPP work item on the Long Term Evolution or LTE for short) consisting of eNodeBs (eNBs) such as Macro eNB 102, which provide E-UTRA user plane (PDCP/RLC/MAC/PHY) and control plane (RRC) protocol terminations toward user equipments (UEs), and an Evolved Packet Core (EPC) (not shown). The Macro eNB 102 is connected by means of the S1 interface to the EPC, and more specifically to a Mobility Management Entity (MME) by means of the S1-MME interface and to a Serving Gateway (SGW) by means of the S1-U interface. IN FIG. 1, entities and interfaces such as the MME, SGW, S1 interface and S1-U interface are not shown in the interests of clarity.

Deployment of a small cell base station 106, here a home eNB (HeNB), in the network environment 100 is also shown in FIG. 1. HeNBs are typically deployed by users at more or less random locations (from the network operator's perspective). They rely on the users' fixed broadband for backhaul and are often associated with a closed subscriber group (CSG), where access is limited to specific users or stations that are part of the CSG. Typically, the HeNB 106 automatically integrates itself into the existing "underlay" of a network and therefore has underlying Macro-cell coverage from Macro eNB 102 (i.e., the operator's network). The larger ellipse 104 represents the coverage area ("macrocell") of the Macro eNB 102, while the smaller ellipse 108 represents the coverage area ("small cell") of the HeNB 106. The HeNB 106 interconnects with the EPC over the Internet via a wired or wireless connection. Similar to the Macro eNB 102, the HeNB 106 is connected to the MME by means of the S1-MME interface and to the SGW by means of the S1-U interface. The HeNB 106 can be connected directly to the MME/SGW. Similar to the Macro eNB 102, the HeNB 106 interconnects with the LTE EPC via the S1 interface. An optional Home eNB Gateway (HeNB-GW) may be used to establish the S1 interface. Thus, for the control plane, the S1-MME interface from the HeNB 106 may be terminated at the HeNB-GW, or a direct connection between the HeNB 106 and the MME may be established. For the user plane, the S1-U interface from the HeNB 106 may be terminated at the HeNB-GW, or a direct connection between the HeNB 106 and the SGW may be established. For clarity, the S1 and S1-U interfaces are not shown.

A mobile station 110, which generally refers to various devices with wireless telecommunications capabilities such as a smart phone, PDA, laptop, and the like, is able to connect to the Macro eNB 102 or the HeNB 106, depending on location or the existence of subscription in the case of the HeNB 106.

Figure 2:
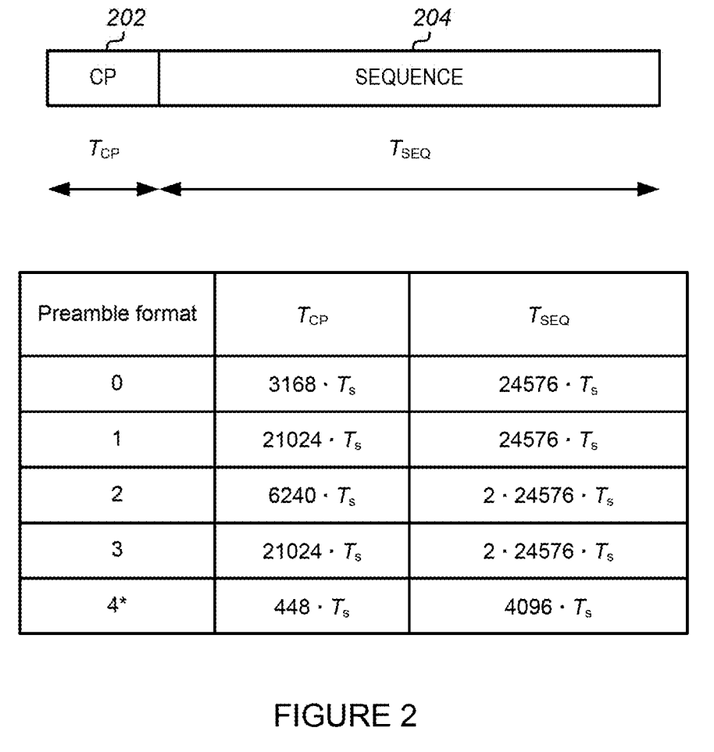
FIG. 2 schematically illustrates possible preamble formats and their composition for LTE.

The LTE RACH (Random Access CHannel) (represented in FIG. 1 as arrow 112) is employed by the UE to gain contended or contention free access to radio resources. The UE can initiate the RACH process for uplink connectivity, or as a response to a paging signal in the downlink. LTE allows 4 (or 5 if TD-LTE is included) RACH preamble formats, which accommodate the different distances the RACH signal has to travel and the multipath effects it has to encounter. The specific RACH format is determined by the eNBs and broadcast on the System Information Blocks (SIBs) for all the UEs in the cell to adhere to. The possible pre-amble formats and their compositions are depicted in FIG. 2.

The pre-amble is made up of two parts, the cyclic prefix (CP) 202 and the sequence (SEQ) 204. In FIG. 2, $T_{CP}$ indicates the length of the CP 202 and $T_{SEQ}$ indicates the length of the SEQ 204. $T_S$ refers to the sampling time, which is (1/30.72) μs. Usually for smaller Macro cells in urban areas, formats '0' or '1' are used. As evident from FIG. 2, the preamble format '2' is twice as long as format '0', and format '3' is 1.5 times longer than format '1'.

Figure 3:
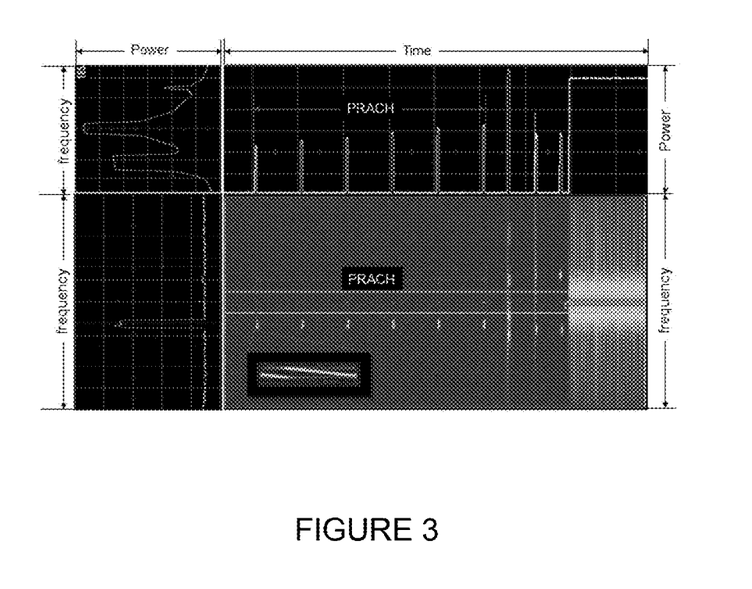
FIG. 3 schematically illustrates a snapshot of the Physical RACH signal for LTE.

FIG. 3 shows a snapshot of the Physical RACH signal for LTE, known as the PRACH. As evident from FIG. 3, the PRACH signal is discreet (dis-continuous) in both the time and frequency domains. The power of the recurring PRACH signal is gradually incremented as well.

The inventors have recognized the suitability of the RACH signal for the wake-up triggering based on the repetitive nature of this signal. If the UE does not get the desired response (resource allocation) from the Macro eNB, it will repeat the signalling. If the Macro eNB does not recognize a certain RACH format, it will simply not respond to it, so that the UE has the opportunity to change the format and re-attempt.

Any UE with connection to the Macro eNB would select the pre-amble format specified by the Macro eNB and also stick to the initial power level set by the uplink power control mechanism. This power level depends mainly on the location of the UE with respect to the Macro eNB. In order to generate a suitable wake-up signal, embodiments provide for either changing the power level of the RACH pre-amble or changing both the power level and the format of the RACH pre-amble.

In one embodiment, the power level of the RACH signal is changed. The default power level for the CSG UE is governed by the Macro eNB to which the UE connects whilst the HeNB is in sleep mode. This power level broadly depends on the distance of the HeNB zone from the Macro eNB. More specifically, the basis for setting the transmission power of the random access preamble is a downlink pathloss estimate obtained from measuring the cell-specific reference signals on the primary downlink component carrier. From this pathloss estimate, the initial PRACH transmission power is obtained by adding a configurable offset. Conventionally, for the first attempt, the PRACH transmission power is set to the initial PRACH power. In most cases this is sufficient for the random access attempts to be successful. By contrast, in the embodiment, the App can instruct the CSG UE to use a power level which is delta increment above the initial PRACH transmission power. The HeNB can determine the transmission power from RACH transmissions of its CSG UEs. For example, using multiple readings the HeNB can determine an average RACH power level for the CSG UEs when they are connecting to the Macro eNB. The HeNB can configure its energy harvesting circuitry to trigger at this power level.

In another embodiment, the format of the RACH preamble is changed (for the first one or two transmissions) in addition to the power level. As per the pre-amble formats shown in FIG. 2, there are distinct length (duration) changes from one format to another. The App can learn which format is used in a particular Macro cell, and will instruct the CSG UE to change it to another format for the first one or two RACH attempts. This change will be not recognized by the Macro eNB and after the first one or two attempts the App will instruct the CSG UE to revert back to the original RACH format. The energy harvesting circuitry in the HeNB can be configured (tuned) to respond to the changed RACH signal and trigger the wake-up mechanism. This circuitry need to respond to both the power level and the duration of the RACH signal, in the format of a capacitive charging circuit, to generate the trigger signal. This needs more complex RF energy harvester than in the former embodiment.

In comparing the embodiments, the former embodiment in which the power level of the RACH signal is changed is simpler to execute but there can be some false triggers as well. For example, a friend's UE which is not part of the CSG can trigger the wake-up of the HeNB, if a RACH attempt is made from within the home in question. The latter embodiment in which the format of the RACH pre-amble is changed in addition to the power level is more complex, but the likelihood of false triggering is very low. The uniqueness of the RACH signal in the latter embodiment is much higher than that of the former embodiment. A full comparison of the two embodiments is provided in the table below.

| Feature | Solution | |
| --- | --- | --- |
| | RACH power only | RACH power, duration |
| Solution complexity | Low | Medium |
| False/Failed Triggering | Low/Medium | Very Low |
| Power Saving Potential | Medium | High |

In the former embodiment, the higher power level will not cause rejection of the RACH attempt by the Macro eNB. In the latter embodiment, the RACH signal will revert back to the original power levels and length format after the first few attempts. Then it will be recognized by the Macro eNB.

Once the Macro eNB grants access to the CSG UE, it will connect to this Macro eNB and initiate communications through it. After the wake-up trigger, the HeNB will perform a fast wake-up process and broadcast its cell-ID and synch signals. The fast wake-up process can be, for example, related to software defined network where the network retains the baseband processing and the small cell base station is simply an RF transmitter similar to an active distributed antenna. The network can allocate some processing power and memory to a particular small cell base station ID when needed. In such a case, the wake-up can only involve the RF part where having small power amplifiers is advantageous. The App in the connected CSG UE will initiate measurements on the HeNB (now a neighbour cell) and provide them to the serving Macro eNB. The Macro eNB, seeing the stronger signals on the HeNB, will hand over the CSG UE to the HeNB. This process of App initiated measurement reporting (rather than the serving cell initiated reporting) makes the hand over process much quicker. The end user of the CSG UE will experience much better QoE with the own HeNB.

It should be noted that with the current state of developments in configuring Apps (for example in Android operating system), the CSG UE locations, HeNB location, the serving cell and neighbour list information and the initiation of signal strength measurements can all be executed.

Figure 4A:
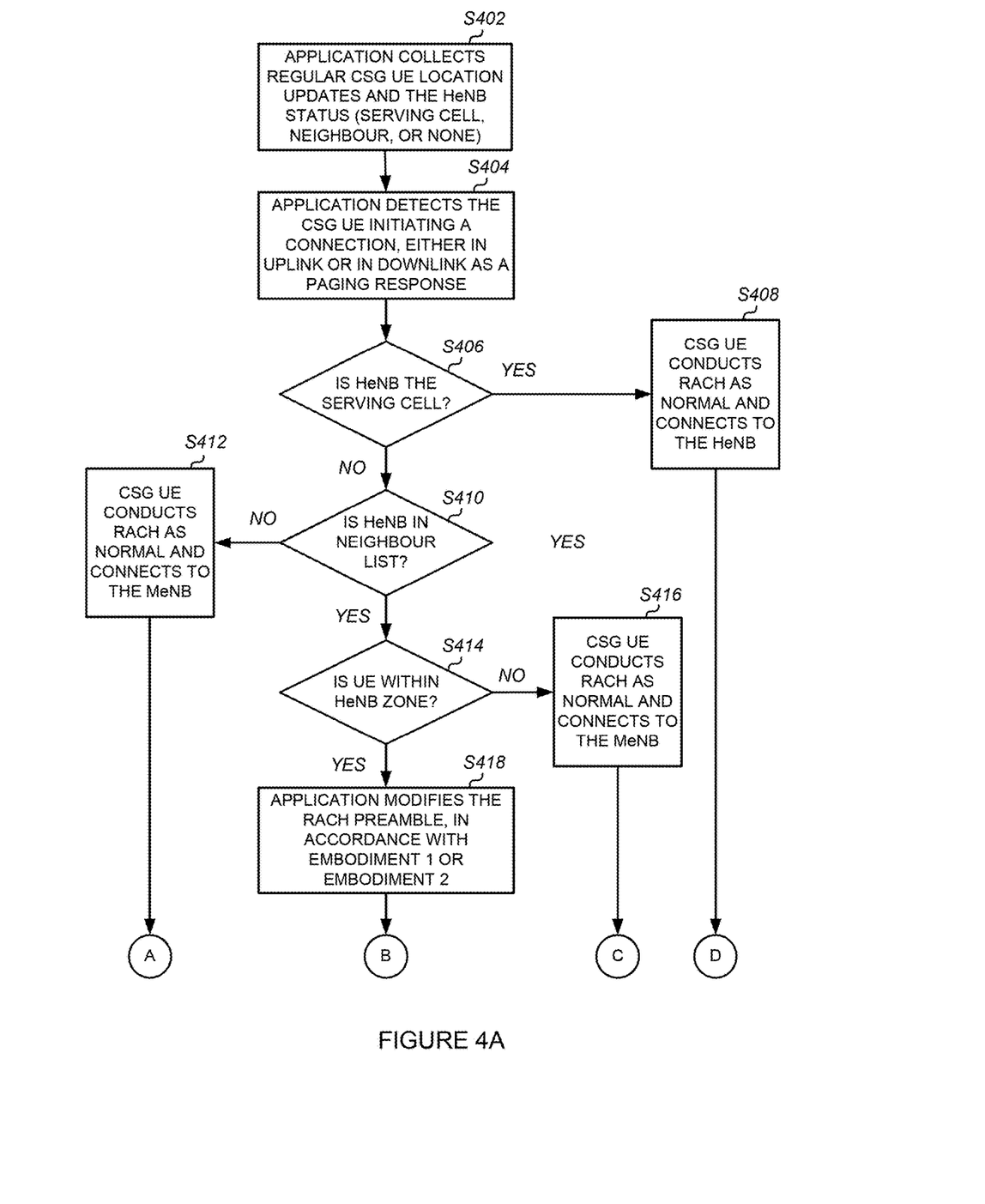
FIGS. 4A and 4B show a flow chart of a method of waking up a small cell base station from a sleep mode in accordance with embodiments.
Figure 4B:
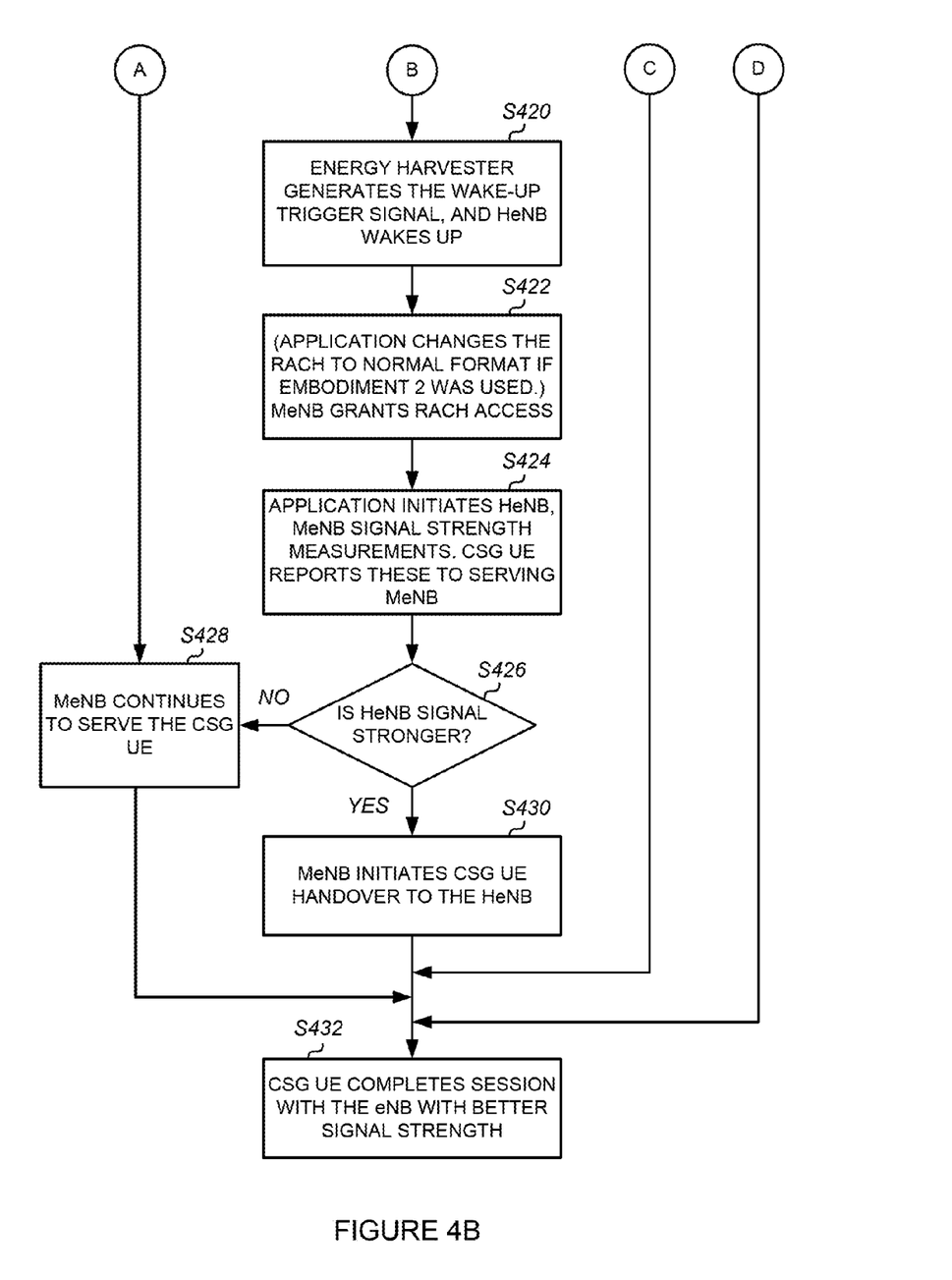

A detailed flow chart for the solution execution is presented below with reference to FIGS. 4A and 4B. For convenience, the expression "embodiment 1" refers to the embodiment in which the power level of the RACH signal is changed, while "embodiment 2" refers to the embodiment in which the format of the RACH pre-amble is changed in addition to the power level. These embodiments are primarily to do with the how the RACH signal is modified to generate the RF wake up signal. The other steps of the flow chart are not affected by this selection. The abbreviations MeNB refers to the Macro eNB and HeNB refers to the Home eNB. Furthermore, for convenience reference is made to the App having certain processing and control functionalities. However, it will be appreciated that, in practice, such processing and control functionalities can be performed by processing circuitry of the mobile station.

Step S402: The App collects regular CSG UE location updates and status information of the HeNB indicating whether the HeNB is a serving cell, a neighbouring cell of the serving cell, or neither.

Step S404: The App detects the CSG UE initiating a connection (i.e., a random access procedure), either in uplink or in downlink as a paging response.

Step S406: The App determines whether the HeNB is the serving cell.

Step S408: If in step S406 the App determines that the HeNB is the serving cell ('YES'), the CSG UE conducts RACH as normal and connects to the HeNB.

Step S410: On the other hand, if in step S406, the App determines that the HeNB is not the serving cell ('NO'), the application then determines whether the HeNB is in its list of neighbouring base stations.

Step S412: If in step S410 the App determines that the HeNB is not in its list of neighbouring base stations ('NO'), the CSG UE conducts RACH as normal and connects to the MeNB which is providing underlay coverage.

Step S414: On the other hand, if in step S410 the App determines that the HeNB is in its list of neighbouring base stations ('YES'), the application then determines whether the CSG UE is within a coverage area of the HeNB.

Step S416: If in step S414 the App determines that the CSG UE is not within the coverage area of the HeNB ('NO'), the CSG UE conducts RACH as normal and connects to the MeNB which is providing underlay coverage.

Step S418: On the other hand, if in step S414 the App determines that the CSG UE is within the coverage area of the HeNB ('YES'), the CSG UE modifies the RACH preamble in accordance with the embodiment 1 or embodiment 2 and transmits the RACH preamble.

Step S420: The energy harvester of the HeNB then harvests energy from the RACH preamble, which triggers the wake-up procedure of the HeNB.

Step S422: If in step S418 embodiment 2 was implemented, then the application reverts the RACH to the normal format. The MeNB grants RACH access in response to receiving the RACH signal.

Step S424: The App initiates HeNB and MeNB signal strength measurements. CSG UE reports these to the serving MeNB.

Step S426: The MeNB determines whether the HeNB signal is stronger.

Step S428: If in step S426 the MeNB determines that the MeNB signal is stronger ('NO'), the MeNB continues to serve the CSG UE.

Step S430: On the other hand, if in step S426 the MeNB determines that the HeNB signal is stronger ('YES'), the MeNB initiates CSG UE handover to the HeNB.

Step S432: The CSG UE can then completes session with the eNB with better signal strength.

Figure 5:
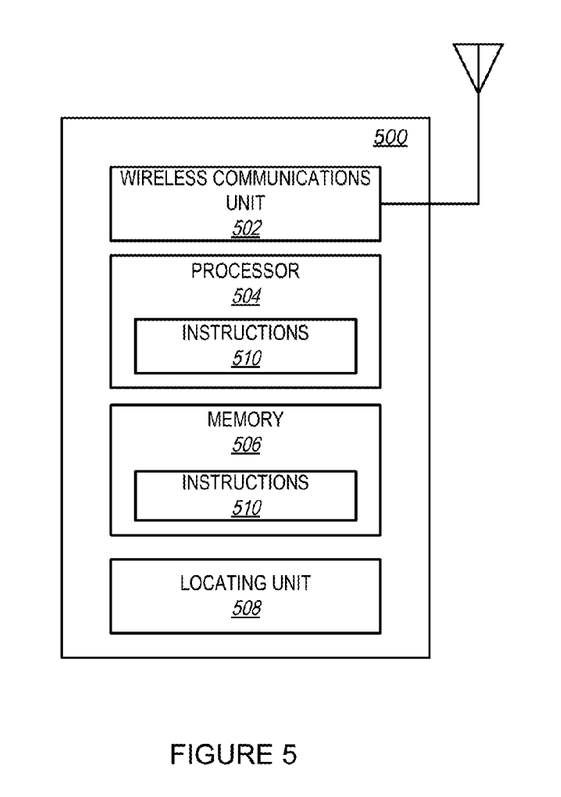
FIG. 5 is block diagram of a mobile station in accordance with an embodiment.
Figure 6:
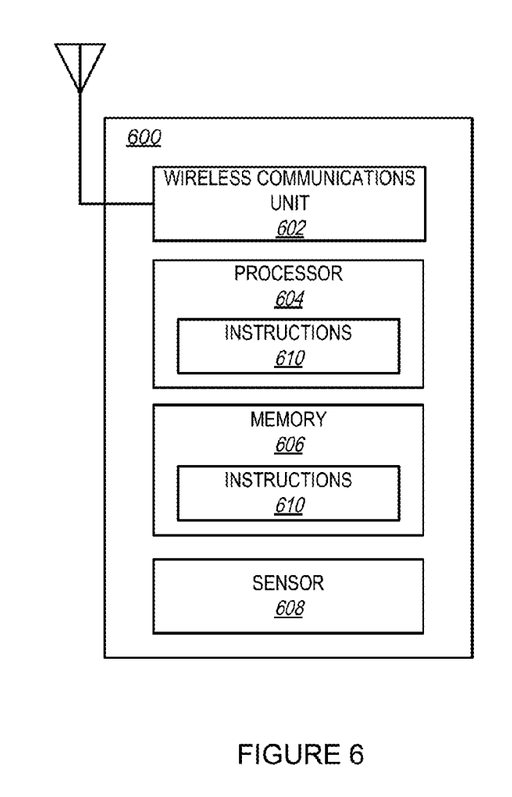
FIG. 6 is a block diagram of a small cell base station in accordance with an embodiment.

FIGS. 5 and 6 are block diagrams respectively of a mobile station 500 and a small cell base station 600, showing only elements which are relevant to the description of the invention.

The mobile station 500 includes a wireless communications unit 502, a processor 504, memory 506, a locating unit 508, and instructions 510. The base station 600 includes a wireless communications unit 602, a processor 604, memory 606, a sensor 608, and instructions 610.

Processor 504, 604 can comprise one or more central processing units (CPUs), graphics processing units (GPUs), accelerated processing units (APUs), or various combinations thereof. Processor 504, 604 provides processing and control functions for the mobile station 500 or small cell base station 600.

Memory 506, 606 comprises one or more transient and static memory units configured to store instructions and data for the mobile station 500 or small cell base station 600.

Wireless communications unit 502, 602 comprises one or more transceivers including, for an appropriate mobile station or small cell base station, at least one antenna such as a multiple-input and multiple-output (MIMO) antenna to support MIMO communications. For the small cell base station 600, the wireless communications unit 602 receives uplink transmissions and transmits downlink transmissions, among other things, from and to the mobile station 500 respectively. For the mobile station 500, the wireless communications unit 502 receives transmissions from the base station 600 (or other mobile stations in direct link communications) and transmits data back to the base station 600 (or other mobile station in direct link communications).

Instructions 510, 610 comprise one or more sets of instructions or software executed by processor 504, 604 to perform any of the methodologies discussed herein. The instructions 510, 610 may reside, completely or at least partially, within processor 505, 604 and/or memory 506, 606 during execution thereof by the mobile station 500 or small cell base station 600.

In FIGS. 5 and 6, processing and control functionalities are illustrated as being provided by processor 504, 604 along with associated instructions 510, 610. However, these are only examples of processing circuitry that comprise programmable logic or circuitry (e.g., as encompassed within a general-purpose processor or other programmable processor) that is temporarily configured by software or firmware to perform certain operations. In various embodiments, processing circuitry may comprise dedicated circuitry or logic that is permanently configured (e.g., within a special-purpose processor, application specific integrated circuit (ASIC), or array) to perform certain operations. It will be appreciated that a decision to implement a processing circuitry mechanically, in dedicated and permanently configured circuitry, or in temporarily configured circuitry (e.g., configured by software) may be driven by, for example, cost, time, energy-usage, package size, or other considerations. Accordingly, the term "processing circuitry" should be understood to encompass a tangible entity, be that an entity that is physically constructed, permanently configured (e.g., hardwired), or temporarily configured (e.g., programmed) to operate in a certain manner or to perform certain operations described herein.

The locating unit 508 of the mobile station 500 is configured to determine a location of the mobile station 500, and can be a GPS circuit, a circuit configured to triangulate position data based on cell phone towers, or other type of location detecting circuit.

The sensor 608 of the small cell base station can be a passive RF harvesting module. Typically, an RF harvesting module generates RF energy (converts RF into DC), stores the electrical energy, and outputs a signal, for example to trigger the wake up procedure of the small cell base station, when the stored electrical energy exceeds a threshold. An exemplary RF harvesting module is the Powercast P2110 chip with an RF input pin for an antenna connection and a DC pulse output, operating at 915 MHz, can work at input power levels up to −11.5 dBm. The datasheet is available at http://www.mouser.com/ds/2/329/P2110-datasheet-1690.pdf and is incorporated herein by reference in its entirety. Preferably, the passive RF harvesting module has 10 dB more signal power sensitivity and is software programmable to be triggered at certain power level thresholds and also at certain signal durations.

Although described embodiments refer to a HeNB, the techniques described herein are applicable to other types of base stations. In particular, the term "small cell" is generally used herein to refer to cells that are smaller than macrocells. The corresponding base stations are referred to herein as "small cell base stations" and "macrocell base stations" respectively. Such smaller sized cells can be established within a macrocell and can be variously referred to as microcells, picocells, or femtocells.

Although described embodiments refer to increasing the transmission energy by changing the power level of the RACH pre-amble or changing both the power level and the format of the RACH pre-amble, the wake-up procedure of the small cell base station can also be triggered by changing only the format of the RACH pre-amble. Furthermore, other types of signals can also be used to trigger wake-up of the small cell base station.

Although described embodiments refer to completely powering off the HeNB when in sleep mode, alternatively entering the sleep mode can include powering off the RF part (including the antenna, transmitter and receiver) as well as the baseband part (including signal processor and microprocessor components) of the base station. Typically, such processing parts consume between 60-70% of the power of the small cell base station.

Although described embodiments refer to the Long Term Evolution (LTE) set of standards, the techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. CDMA2000 covers IS-2000, IS-95, and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the wireless networks and radio technologies mentioned above as well as other wireless networks and radio technologies.

Embodiments have been described with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

While the invention has been described with reference to exemplary embodiments, it will be apparent to those skilled in the art that various modifications and variations can be made without departing from the spirit and scope of the present invention. For instance, features illustrated or described as part of one embodiment can be used with another embodiment to yield a still further embodiment. Thus, it is intended that the present invention include such modifications and variations as come within the scope of the appended claims and their equivalents.

What is claimed is:

1. A method of waking up a small cell base station from a sleep mode, controlled by a mobile station involved in a random access procedure in which the mobile station is to transmit a standard access signal to a serving macrocell base station in whose coverage area the small cell base station is located, the method comprising:
   by the mobile station:
      determining, based on stored location information indicating a location of the small cell base station and on a monitored current location of the mobile station, that the mobile station is in a coverage area of the small cell base station,
      determining, from serving cell information and a neighbour cell list, that the small cell base station is in the sleep mode,
      determining, based on system information received from the serving macrocell base station, a transmission format of the standard access signal that is expected by the serving base station,
      changing a transmission characteristic of the standard access signal so as to increase its transmission energy, in response to the determining, wherein changing the transmission characteristic of the standard access signal comprises changing the transmission format of the standard access signal to a transmission format that is not expected by the serving base station, and wherein changing the transmission format of the standard access signal comprises increasing a transmission duration of the standard access signal, and
      transmitting the changed access signal; and
   by the small cell base station:
      harvesting energy from the changed access signal that is transmitted by the mobile station, using a passive energy harvesting sensor, the harvested energy triggering a wake-up procedure in the small cell base station.

2. The method according to claim 1, wherein the mobile station determines, based on a measurement of a reference signal transmitted by the serving macrocell base station, a transmission power to be used for transmitting the standard access signal, and wherein changing the transmission characteristic of the standard access signal comprises increasing the transmission power.

3. The method according to claim 1, further comprising, after transmitting the changed access signal at least once, reverting the transmission format of the changed access signal back to the transmission format of the standard access signal that is expected by the serving base station.

4. The method according to claim 1, further comprising, by the mobile station after transmission of the changed access signal: establishing a connection to the serving macrocell base station and, in response to detecting broadcast signals transmitted by the small cell base station after the wake-up procedure has been triggered, performing measurements on reference signals included as part of the broadcast signals and reporting the measurements to the serving macrocell base station.

5. The method according to claim 1, wherein the mobile station wirelessly receives, from the small cell base station in advance, location information of the small cell base station and computer readable program code which, when executed by a mobile station, causes the mobile station to perform the respective method steps.

6. The method according to claim 1, wherein the standard access signal comprises a standard random access preamble.

7. A method of waking up a small cell base station from a sleep mode, controlled by a mobile station involved in a random access procedure in which the mobile station is to transmit a standard access signal to a serving macrocell base station in whose coverage area the small cell base station is located, the method performed by the mobile station and comprising:

determining, based on stored location information indicating a location of the small cell base station and on a monitored current location of the mobile station, that the mobile station is in a coverage area of the small cell base station;

determining, from serving cell information and a neighbour cell list, that the small cell base station is in the sleep mode;

determining, based on system information received from the serving macrocell base station, a transmission format of the standard access signal that is expected by the serving base station, changing a transmission characteristic of the standard access signal so as to increase its energy, in response to the determining, wherein changing the transmission characteristic of the standard access signal comprises changing the transmission format of the standard access signal to a transmission format that is not expected by the serving base station, and wherein changing the transmission format of the standard access signal comprises increasing a transmission duration of the standard access signal; and transmitting the changed access signal.

8. A method of waking up a small cell base station from a sleep mode, controlled by a mobile station involved in a random access procedure in which the mobile station changes a transmission characteristic of a standard access signal so as to increase its transmission energy, and transmits the changed standard access signal to a serving macrocell base station in whose coverage area the small cell base station is located, the method performed by the small cell base station and comprising: harvesting energy from the changed standard access signal that is transmitted by the mobile station, using a passive Radio Frequency (RF) harvesting circuit, the harvested energy triggering a wake-up procedure in the small cell base station, wherein the small cell base station wirelessly transmits, to the mobile station in advance, location information indicating a location of the small cell base station and computer readable program code which, when executed by a mobile station, causes the mobile station to: change the transmission characteristic of the standard access signal, when the mobile station determines that the mobile station is in a coverage area of the small cell base station and that the small cell base station is in the sleep mode, and transmit the changed access signal.

9. A wireless communications system, comprising:
a mobile station, comprising:
a processor;
a transmitter configured to transmit standard access signals;
a Global Positioning System (GPS) circuit configured to determine a current location of the mobile station; and
memory configured to store location information indicating a location of a small cell base station and computer readable program code which, when executed by the processor, causes the processor to:
monitor the current location of the mobile station,
determine, based on the stored location information and on the monitored current location of the mobile station, that the mobile station is in a coverage area of the small cell base station,
determine, from serving cell information and a neighbour cell list, that the small cell base station is in a sleep mode, determine, based on system information received from a serving macrocell base station, a transmission format of the standard access signal that is expected by the serving base station, change a transmission characteristic of a standard access signal so as to increase its transmission energy, in response to the determining, wherein changing the transmission characteristic of the standard access signal comprises changing the transmission format of the standard access signal to a transmission format that is not expected by the serving base station, and wherein changing the transmission format of the standard access signal comprises increasing a transmission duration of the standard access signal and transmit the changed standard access signal; and a small cell base station located in a coverage area of a macrocell base station, comprising:
a wireless communications unit; and
a passive Radio Frequency (RF) harvesting circuit configured to, when the small cell base station is in a sleep mode, harvest energy from the changed access signal transmitted by the mobile station, and output a signal configured to trigger a wake-up procedure of the small cell base station.

10. A mobile station, comprising:
a processor;
a transmitter configured to transmit standard access signals;
a Global Positioning System (GPS) circuit configured to determine a current location of the mobile station; and
memory configured to store location information indicating a location of a small cell base station and computer readable program code which, when executed by the processor, causes the processor to:
monitor the current location of the mobile station,
determine, based on the stored location information and on the monitored current location of the mobile station, that the mobile station is in a coverage area of a small cell base station,
determine, from serving cell information and a neighbour cell list, that the small cell base station is in a sleep mode,
determine, based on system information received from a serving macrocell base station, a transmission format of the standard access signal that is expected by the serving base station,
change a transmission characteristic of a standard access signal so as to increase its transmission energy, in response to the determining, wherein changing the transmission characteristic of the standard access signal comprises changing the transmission format of the standard access signal to a transmission format that is not expected by the serving base station, and wherein changing the transmission format of the standard access signal comprises increasing a transmission duration of the standard access signal, and
transmit the changed standard access signal.

11. A computer program product comprising a non-transitory computer readable storage medium storing computer readable program code which, when executed by a mobile station, causes the mobile station to perform operations of:
determining, based on stored location information indicating a location of a small cell base station and on a monitored current location of the mobile station, that the mobile station is in a coverage area of the small cell base station;

determining, from serving cell information and a neighbour cell list, that the small cell base station is in a sleep mode;

determining, based on system information received from a serving macrocell base station, a transmission format of a standard access signal that is expected by a serving base station, changing a transmission characteristic of the standard access signal so as to increase its energy, in response to the determining, wherein changing the transmission characteristic of the standard access signal comprises changing the transmission format of the standard access signal to a transmission format that is not expected by the serving base station, and wherein changing the transmission format of the standard access signal comprises increasing a transmission duration of the standard access signal; and transmitting the changed access signal.

\* \* \* \* \*